(12) United States Patent
Omagari et al.

(10) Patent No.: US 8,262,093 B2
(45) Date of Patent: Sep. 11, 2012

(54) OIL SEAL AND POWER TRANSMISSION APPARATUS

(75) Inventors: Kazutoshi Omagari, Anjo (JP); Teruhito Fukuoka, Anjo (JP); Kenji Nagai, Anjo (JP); Naruhito Nagase, Anjo (JP); Youhei Habata, Toyota (JP); Hiroya Mizuta, Toyota (JP); Masaharu Tanaka, Toyota (JP)

(73) Assignees: Aisin AW Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 417 days.

(21) Appl. No.: 12/413,910

(22) Filed: Mar. 30, 2009

(65) Prior Publication Data
US 2009/0243227 A1   Oct. 1, 2009

(30) Foreign Application Priority Data
Mar. 31, 2008   (JP) ................... 2008-090111

(51) Int. Cl.
*F16J 15/32* (2006.01)
*F16H 57/04* (2010.01)
(52) U.S. Cl. ............. 277/551; 277/562; 475/159
(58) Field of Classification Search .......... 277/549, 277/551, 562; 184/65, 70; 192/85.44; 475/159
See application file for complete search history.

(56) References Cited

U.S. PATENT DOCUMENTS

| | | | | |
|---|---|---|---|---|
| 3,741,615 A | * | 6/1973 | Otto | 384/486 |
| 3,746,128 A | * | 7/1973 | Wunsch | 184/6.11 |
| 3,913,924 A | * | 10/1975 | Barefoot et al. | 277/574 |
| 4,208,057 A | * | 6/1980 | Messenger | 277/309 |
| 4,252,329 A | * | 2/1981 | Messenger | 277/551 |
| H749 H | * | 3/1990 | Nagashima | 277/568 |
| 5,018,750 A | | 5/1991 | Sparks et al. | |
| 5,577,741 A | * | 11/1996 | Sink | 277/559 |
| 6,890,280 B2 | * | 5/2005 | Oshidari et al. | 475/159 |
| 2007/0222161 A1 | * | 9/2007 | Voydatch et al. | 277/551 |
| 2007/0257446 A1 | * | 11/2007 | Tanida et al. | 277/549 |

FOREIGN PATENT DOCUMENTS

| | | |
|---|---|---|
| JP | 60-121365 A | 6/1985 |
| JP | 2-146268 | 12/1990 |
| JP | 3-20174 A | 1/1991 |
| JP | 06-313471 | * 11/1994 |
| JP | 06-313471 A | 11/1994 |
| JP | 2002-372133 A | 12/2002 |
| JP | 2003-120894 A | 4/2003 |

* cited by examiner

*Primary Examiner* — Vishal Patel
*Assistant Examiner* — Nicholas L Foster
(74) *Attorney, Agent, or Firm* — Sughrue Mion, PLLC (57) ABSTRACT

An oil seal for sealing a hollow rotary shaft in a power transmission apparatus, wherein the rotary shaft is formed with an internal flow passage through which oil flows and constituted such that the oil flies out as the rotary shaft rotates, including: a fixed portion that is fixedly attached to a case of the power transmission apparatus; a seal portion that seals the rotary shaft at a position that is axially offset position from the fixed portion and allows the rotary shaft to rotate; and a radiator portion that is formed from a metallic material between the fixed portion and the seal portion, receives the oil that flies out as the rotary shaft rotates, and dissipates heat generated by the seal portion by exchanging heat with the oil.

4 Claims, 7 Drawing Sheets

FIG.7

OIL SEAL AND POWER TRANSMISSION APPARATUS

INCORPORATION BY REFERENCE

This Application claims priority from Japanese Patent Application No. 2008-090111, filed on Mar. 31, 2008, the disclosure, including the specification, drawings, and abstract, of which is incorporated herein by reference in its entirety.

BACKGROUND OF THE INVENTION

The present invention relates to an oil seal and a power transmission apparatus. More particularly, the present invention relates to an oil seal for sealing a hollow rotary shaft in a power transmission apparatus in which the rotary shaft is formed with an internal flow passage through which oil flows and constituted such that the oil flies out as the rotary shaft rotates and a power transmission apparatus in which the rotary shaft is sealed using the oil seal.

DESCRIPTION OF THE RELATED ART

The related art has proposed a power transmission apparatus having an automatic transmission including a hollow output shaft formed with an internal flow passage through which lubricating oil flows and a transfer that is disposed in a latter stage of the automatic transmission such that a spline of an input shaft of the transfer engages with a spline of the output shaft of the automatic transmission. Additionally, the related art has proposed the input shaft of the transfer being sealed by an oil seal (see Japanese Patent Application Publication JP-A-H06-313471, for example). In this apparatus, the oil that flows through the flow passage in the output shaft of the automatic transmission is discharged through a gap between where the spline of the output shaft of the automatic transmission and the spline of the input shaft of the transfer intermesh, and a protrusion that leads the discharged oil to the oil seal is formed on a case of the automatic transmission. Hence, even if a seal part of the oil seal generates heat as the rotary shaft rotates, the oil can be used to cool the seal part.

SUMMARY OF THE INVENTION

Since frictional heat is generated in the seal portion of the oil seal during rotation of the shaft in this manner, the seal portion must be cooled effectively, but depending on the shape of the case and so on, it may be impossible to lead the oil to the seal part of the oil seal directly. In this case, the oil seal cannot be cooled sufficiently.

It is an object of the oil seal and power transmission apparatus according to the present invention to cool the oil seal more effectively. However, the present invention is not required to achieve the object described above.

In order to achieve the above object, an oil seal according to a first exemplary embodiment is an oil seal for sealing a hollow rotary shaft in a power transmission apparatus including the rotary shaft, in which the rotary shaft is formed with an internal flow passage through which oil flows and constituted such that the oil flies out as the rotary shaft rotates. The oil seal includes: a fixed portion that is attached fixedly to a case of the power transmission apparatus; a seal portion that seals the rotary shaft rotatably in an axially offset position from the fixed portion; and a radiator portion that is formed from a metallic material between the fixed portion and the seal portion, receives the oil that flies out as the rotary shaft rotates, and dissipates heat generated by the seal portion through heat exchange with the oil.

In the oil seal according to the first exemplary embodiment, the rotary shaft is sealed rotatably by the seal portion in an axially offset position from the fixed portion attached fixedly to the case of the power transmission apparatus. Thus, the oil that flies out as the rotary shaft rotates is received by the radiator portion formed from a metallic material between the fixed portion and the seal portion, and heat generated by the seal portion is dissipated through heat exchange with the oil. As a result, the seal portion can be cooled effectively.

In oil seal according to another exemplary embodiment, the radiator portion may be formed in a substantially tapered shape such that a diameter thereof decreases steadily toward the seal portion. In so doing, oil received on a vertical upper surface side of the radiator portion can be led to the seal portion along the taper by gravity, and therefore the seal portion can be cooled even more effectively. In the oil seal according to this exemplary embodiment, the radiator portion may be formed from a combination of a cylindrical portion provided on the fixed portion side and a tapered portion provided on the seal portion side. In so doing, an improvement in component strength can be achieved.

In the oil seal according to another exemplary embodiment, the hollow rotary shaft may be formed with a through hole for leading the oil flowing through the interior thereof to the radiator portion. In so doing, the oil can be supplied to the radiator portion more reliably. In the oil seal according to this exemplary embodiment, a groove for storing the oil temporarily may be formed in an inner wall surface of the hollow rotary shaft, and the groove may be formed to communicate with the through hole. In so doing, the oil can be supplied to the radiator portion with stability.

Also, in order to achieve the above object, a power transmission apparatus has a hollow rotary shaft formed with an internal flow passage through which oil flows and constituted such that the oil flies out as the rotary shaft rotates, and is formed such that the rotary shaft is sealed using the oil seal according to any of the exemplary embodiments described above.

In the power transmission apparatus described above, the rotary shaft is sealed using the oil seal according to any of the exemplary embodiments described above. Therefore the power transmission apparatus has similar effects to the effects of the oil seal according to the exemplary embodiments, for example effective cooling of the seal portion.

DETAILED DESCRIPTION OF THE EXEMPLARY EMBODIMENTS

Next, an exemplary embodiment of the present invention will be described.

Figure 1:
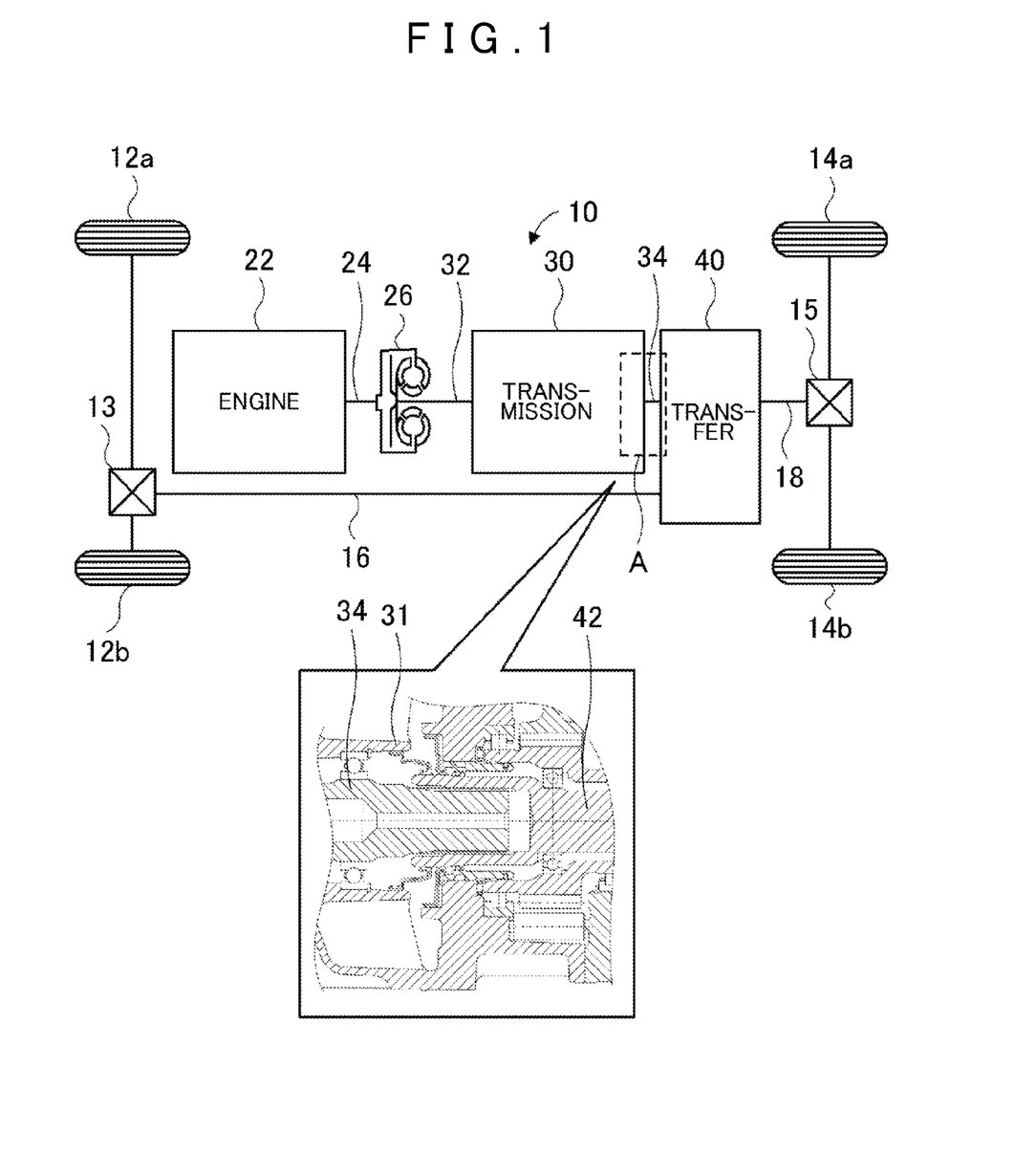
FIG. 1 is a block diagram showing an outline of the constitution of an automobile 10 installed with a power transmission apparatus serving as an exemplary embodiment of the present invention.
Figure 2:
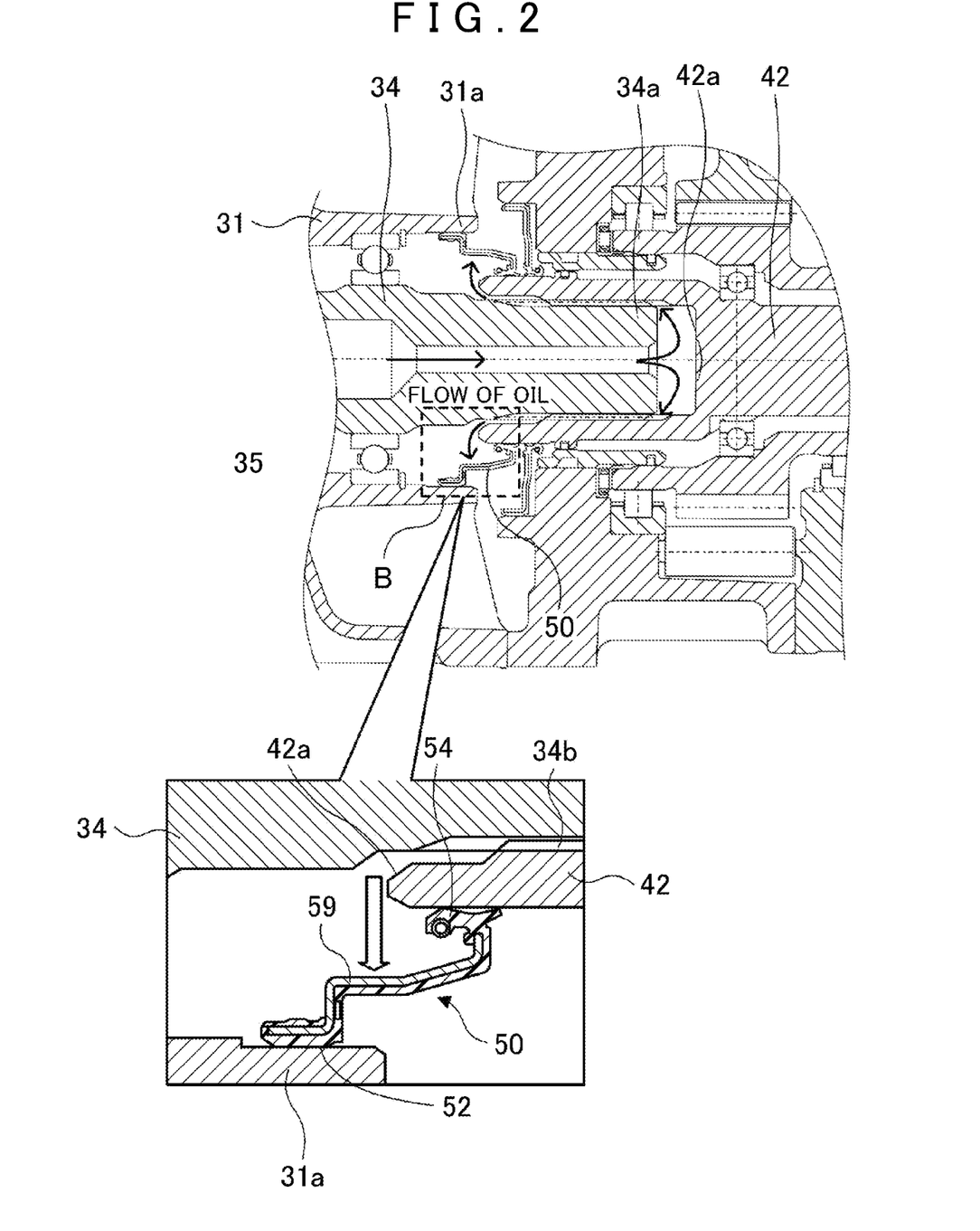
FIG. 2 is an enlarged view of an A region of the power transmission apparatus shown in FIG. 1.

FIG. 1 is a block diagram showing an outline of the constitution of an automobile 10 installed with a power transmission apparatus serving as an exemplary embodiment of the present invention, and FIG. 2 is an enlarged view of an A region of the power transmission apparatus shown in FIG. 1. As shown in the drawings, the automobile 10 according to this embodiment includes an engine 22 (for example, an internal combustion engine that outputs motive power by subjecting a hydrocarbon-based fuel such as gasoline or light oil to explosive combustion), a torque converter 26 attached to a crankshaft 24 of the engine 22, a transmission 30 having an input shaft 32 that is connected to an output side of the torque converter 26 for shifting the motive power from the torque converter 26 and transmitting the shifted motive power to an output shaft 34, and a transfer 40 having an input shaft 42 that is connected to the output shaft 34 for distributing the motive power from the output shaft 34 to a front axle 16 connected to front wheels 12a, 12b via a differential gear 13 and a rear axle 18 connected to rear wheels 14a, 14b via a differential gear 15. Note that the transmission 30 and the transfer 40 correspond to the power transmission apparatus of this exemplary embodiment.

Although not shown in the drawings, the transmission 30 is constituted by a plurality of planetary gear mechanisms, a plurality of clutches and brakes, and so on. By switching the clutches and brakes ON and OFF, the motive power of the input shaft 32 is shifted between a plurality of shift speeds and then transmitted to the output shaft 34.

As shown in FIG. 2, a projecting portion 34a is formed with a spline extending in an axial direction on an end portion of the output shaft 34, and a recess portion 42a is also formed with a spline extending in the axial direction on an end portion of the input shaft 42. By engaging the splines of the projecting portion 34a and the recess portion 42a, the output shaft 34 of the transmission 30 and the input shaft 42 of the transfer 40 are connected. Further, a flow passage 34b, through which oil pumped from an oil pump (not shown) flows, is formed around the axis of the output shaft 34 in the transmission 30, and the oil from the flow passage 34b is discharged through a gap in the intermeshed splines described above and supplied to mechanical parts such as a bearing 35 that supports the output shaft 34 rotatably on a case 31.

Figure 3:
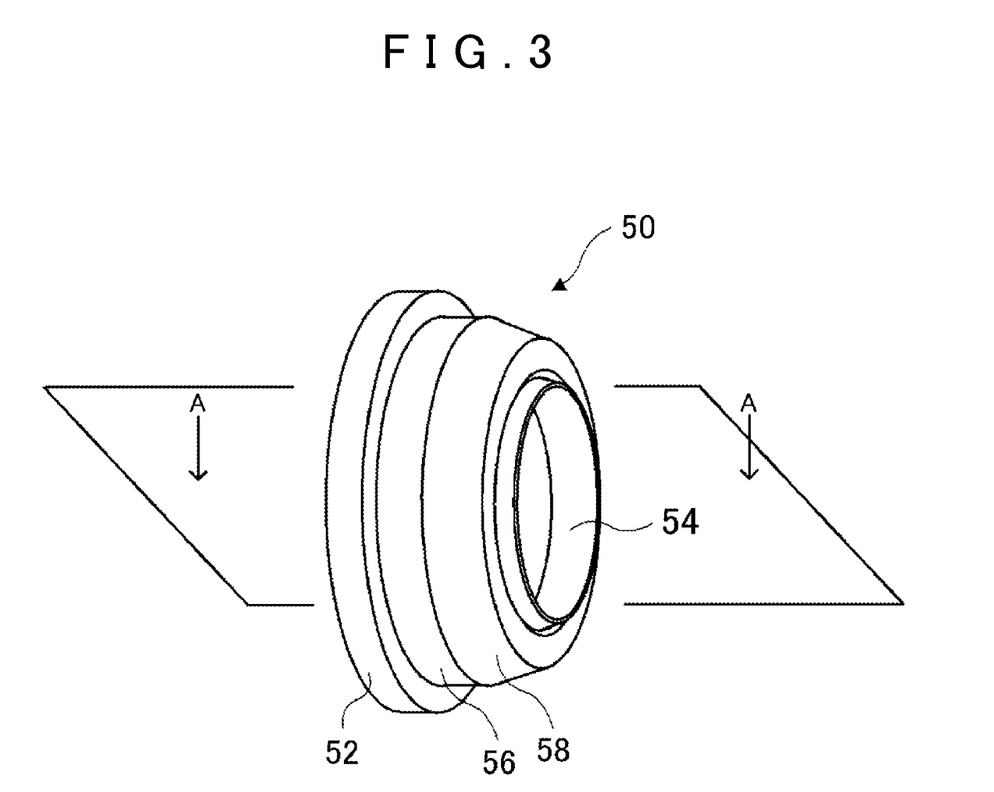
FIG. 3 is an exterior perspective view showing the exterior of an oil seal 50.
Figure 4:
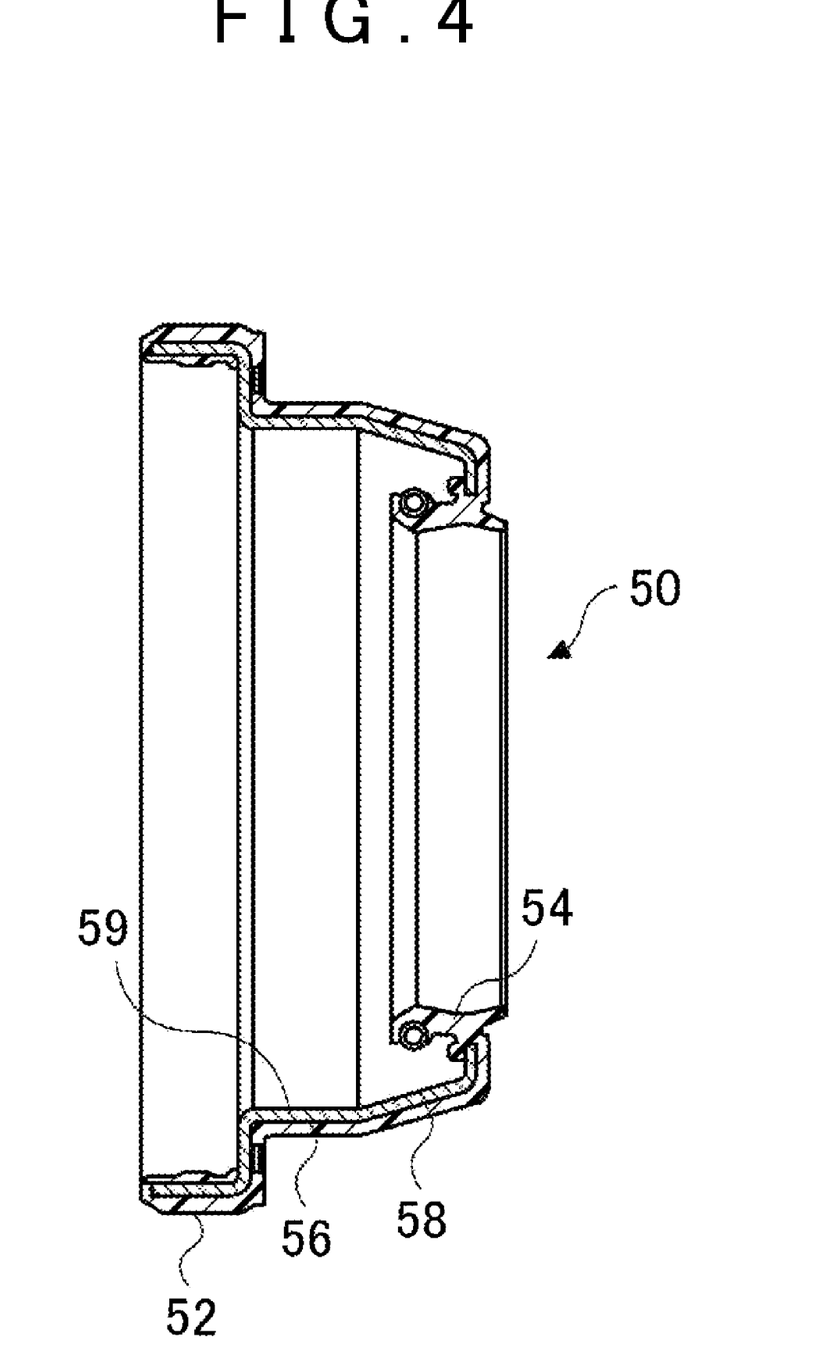
FIG. 4 is a sectional view showing an A-A cross-section of the oil seal 50 shown in FIG. 3.

Further, as shown in FIG. 2, a projecting portion 31 a is formed on the case 31 of the transmission 30 and projects in a cylindrical shape, and an oil seal 50 for sealing the input shaft 42 of the transfer 40 is press-fitted into the projecting portion 31a. FIG. 3 is an exterior perspective view showing the exterior of the oil seal 50, and FIG. 4 is a sectional view showing an A-A cross-section of the oil seal 50 shown in FIG. 3. The oil seal 50 includes a press-fitting portion 52 that is formed in a cylindrical shape having a substantially identical diameter to that of the projecting portion 31a and press-fitted into the projecting portion 31a, a seal portion 54 that seals the input shaft 42 at a position that is axially offset from the press-fitting portion 52 by means of a cylindrical portion 56 having a smaller diameter than the press-fitting portion 52 and a tapered portion 58 formed with a diameter that decreases gradually as the tapered portion 58 extends from the cylindrical portion 56, and a radiator plate 59 (see FIG. 4) that is made of metal (iron, copper, or another metal, for example) and attached to an inner peripheral surface of the cylindrical portion 56 and the tapered portion 58.

The input shaft 42 of the transfer 40 is designed such that an end surface of the recess portion 42a, which is an oil discharge port, is positioned within an interior space that is surrounded by the radiator plate 59 of the oil seal 50. Therefore, when the input shaft 42 rotates, the oil that flies out from the end surface of the recess portion 42a can be received by the radiator plate 59. As a result, heat generated by the seal portion 54 when the input shaft 42 rotates is dissipated by heat being exchanged between the oil and the radiator plate 59, and therefore the seal portion 54 does not receive a thermal effect. Further, as described above, the seal portion 54 of the oil seal 50 is formed to be axially offset from the press-fitting portion 52 by the combination of the cylindrical portion 56 and the tapered portion 58, and therefore oil that is received on a vertical upper surface side of the tapered portion 58 flows along the taper into the seal portion 54 due to gravity. Accordingly, the seal portion 54 can be cooled directly by a part of the oil received on the radiator plate 59. Also, note that the oil that is supplied directly to the seal portion 54 flows to a vertical lower surface side of the seal portion 54 along the taper of the tapered portion 58.

According to the oil seal 50 of the exemplary embodiment described above, the oil seal 50 is formed from the press-fitting portion 52 for being press-fit into the cylindrical protruding portion 31a of the case 31, the seal portion 54 for sealing the input shaft 42 and which is axially offset from the press-fitting portion 52 by the combination of the cylindrical portion 56 and the tapered portion 58, and the radiator plate 59 which is disposed on the inner surface of the cylindrical portion 56 and tapered portion 58. Additionally, the oil seal 50 is disposed such that the end surface of the recess portion 42a (the oil discharge port) is positioned within the interior space that is surrounded by the radiator plate 59. Therefore, the oil that flies out as the input shaft 42 rotates can be received by the radiator plate 59, and heat generated in the seal portion 54 as the input shaft 42 rotates can be dissipated through heat being exchanged between the oil and the radiator plate 59. As a result, the seal portion 54 can be effectively cooled. Furthermore, the seal portion 54 is disposed so as to be axially offset from the press-fitting portion 52 by the cylindrical portion 56 and the tapered portion 58, and therefore the oil that is received on the vertical upper surface side of the tapered portion 58 is supplied to the seal portion 54 along the taper due to gravity, whereby the seal portion 54 can be cooled directly. Moreover, since the seal portion 54 is formed at a position that is axially offset from the press-fitting portion 52 by the combination of the cylindrical portion 56 and the tapered portion 58, the strength of the component is improved.

Figure 5:
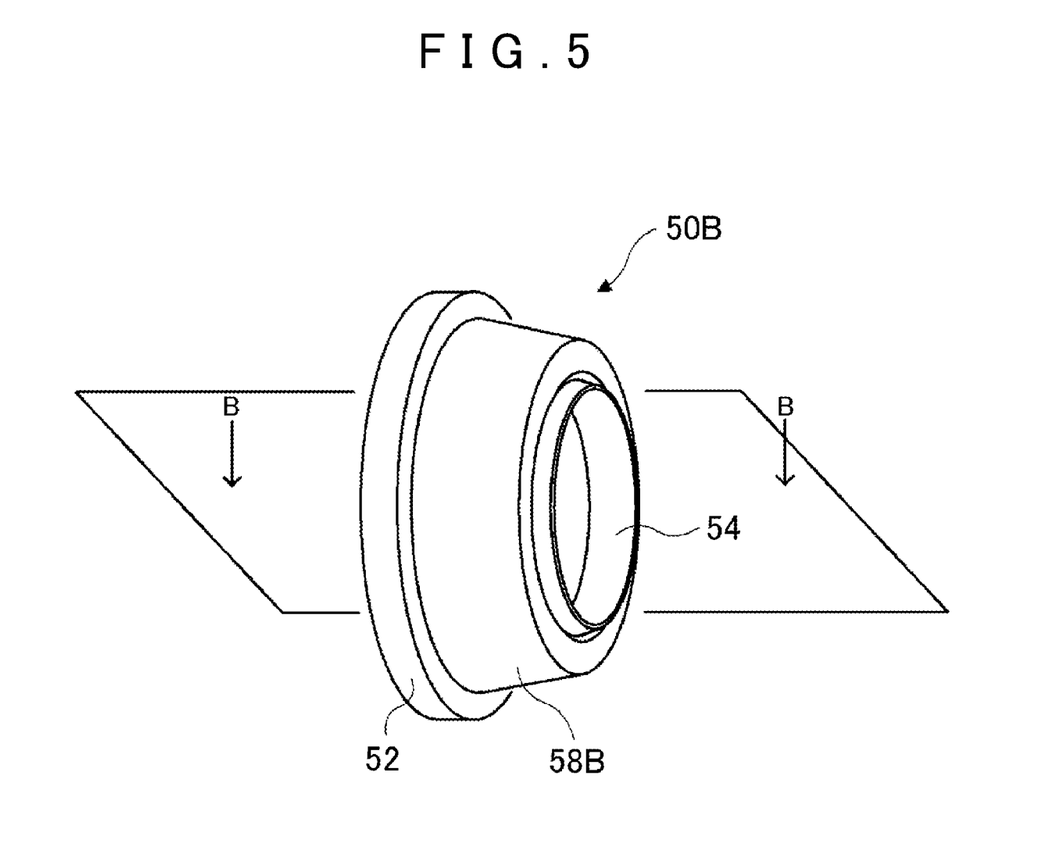
FIG. 5 is an exterior perspective view showing the exterior of an oil seal 50B according to a modified exemplary embodiment of the present invention.
Figure 6:
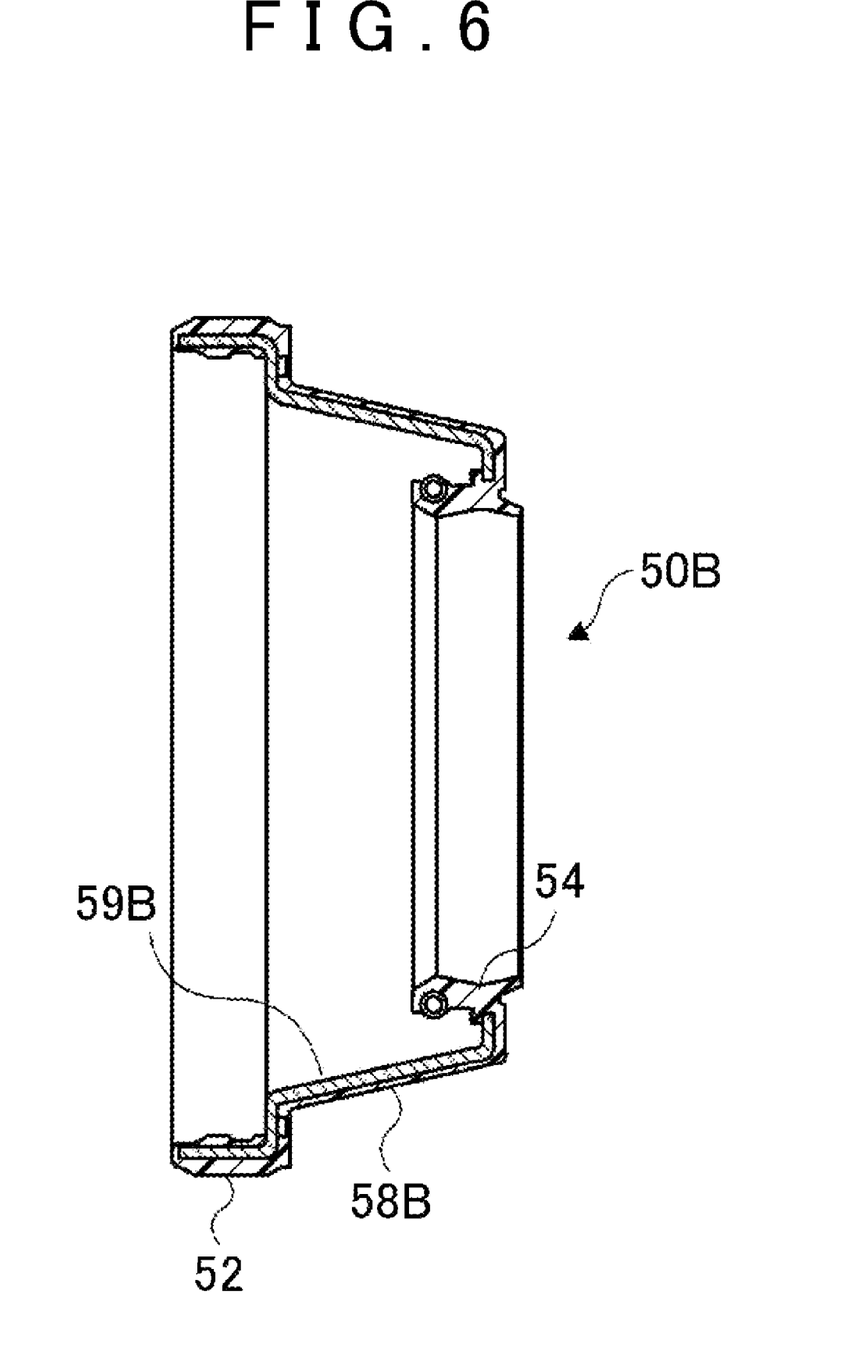
FIG. 6 is a sectional view showing a B-B cross-section of the oil seal 50B shown in FIG. 5.

In the oil seal 50 according to this exemplary embodiment, the seal portion 54 is formed at a position that is axially offset from the press-fitting portion 52 by the combination of the cylindrical portion 56 and the tapered portion 58, but the seal portion 54 may be formed at a position that is axially offset from the press-fitting portion by a cylindrical portion alone or by a tapered portion alone. FIG. 5 is an exterior perspective view showing the exterior of an oil seal 50B according to a modified example, and FIG. 6 is a sectional view showing a B-B cross-section of the oil seal 50B shown in FIG. 5. In the oil seal 50B according to this modified example, the seal portion 54 is formed at a position that is offset from the press-fitting portion 52 by a tapered portion 58B alone instead of the cylindrical portion 56 and the tapered portion 58. Also, a radiator plate 59B is formed on the inner surface of the tapered portion 58B and has an identical shape to the tapered portion 58B. Thus, more of the oil that is received on the vertical upper surface side of the radiator plate 59B will flow to the seal portion 54, whereby the seal portion 54 can be effectively cooled.

Figure 7:
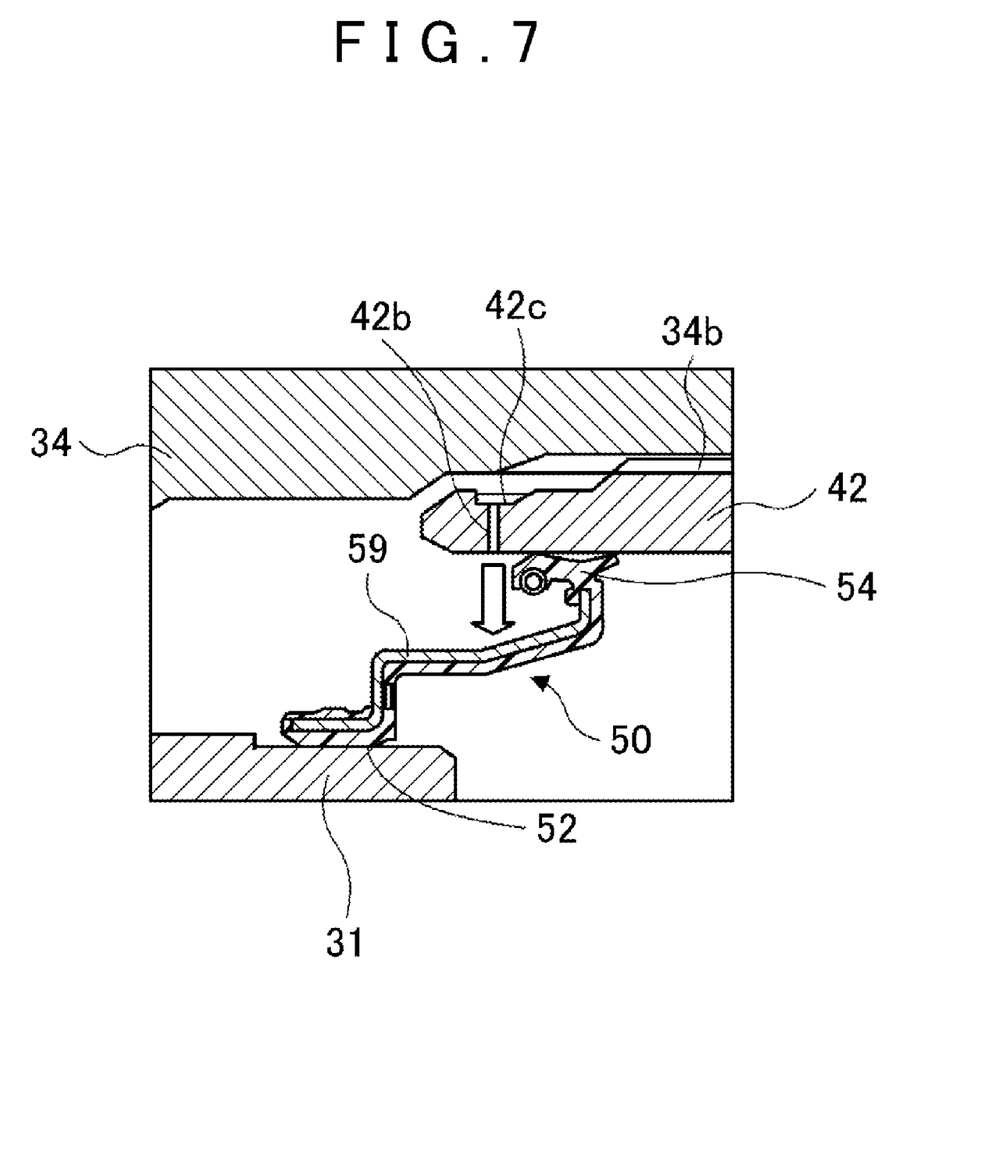
FIG. 7 is a partial sectional view showing a partial cross-section of a power transmission apparatus according to a modified exemplary embodiment of the present invention.

In the above exemplary embodiment, the oil is supplied to the radiator plate 59 from the end surface of the recess portion 42a. However, as shown in FIG. 7, by providing a through hole 42b in the input shaft 42, the oil can be supplied to the radiator plate 59 through the through hole 42b. Also, an oil reservoir groove 42c may be formed in an inner surface of the input shaft 42 so that it communicates with the through hole 42b and temporarily stores the oil.

The exemplary embodiment describes the oil seal 50, but the present invention may also be applied to a power transmission apparatus in which a rotary shaft is sealed by the oil seal 50.

An exemplary embodiment of the present invention was described above, but the present invention is not limited to this exemplary embodiment in any way, and may be implemented in various embodiments within a scope that does not depart from the spirit thereof.

The present invention may be used in the automobile industry.

What is claimed is:

1. A power transmission apparatus comprising:
   a hollow rotary shaft;
   an oil seal for sealing the hollow rotary shaft, the hollow rotary shaft formed with an internal flow passage through which oil flows and also with an oil discharge port from which the oil flies out as the hollow rotary shaft rotates, comprising:
   a fixed portion that is fixedly attached to a case of the power transmission apparatus;
   a seal portion that seals the rotary shaft at a position that is axially offset from the fixed portion and allows the rotary shaft to rotate; and
   a radiator portion that is disposed so as to overlap with the oil discharge port in an axial direction of the rotary shaft, is formed from a metallic material between the fixed portion and the seal portion, is formed in a substantially tapered shape such that a diameter of a tapered portion decreases steadily towards the seal portion, receives the oil that flies out as the rotary shaft rotates, and dissipates heat generated by the seal portion by exchanging heat with the oil,
   wherein the oil discharge port is an opening formed on an outer circumferential surface of the hollow rotary shaft, and
   wherein the hollow rotary shaft comprises a first shaft portion and a second shaft portion, an outer surface of the first shaft portion being disposed within an inner hollow part of the second shaft portion, and the opening of the discharge port is formed by an outer circumferential surface of the first shaft portion and an end of the second shaft portion.

2. The power transmission apparatus according to claim 1, wherein the radiator portion further comprises a cylindrical portion;
   wherein the cylindrical portion is provided closer to the fixed portion than the tapered portion.

3. The power transmission apparatus according to claim 1, wherein the hollow rotary shaft is formed with a through hole for leading the oil flowing through the interior thereof to the radiator portion.

4. The power transmission apparatus according to claim 3, further comprising:
   a groove for temporarily storing the oil, the groove being formed in an inner wall surface of the hollow rotary shaft, and
   the groove communicates with the through hole.

* * * * *